US010983210B2

(12) United States Patent
Wos et al.

(10) Patent No.: US 10,983,210 B2
(45) Date of Patent: Apr. 20, 2021

(54) ELEVATOR SENSOR ARRAY SYSTEM

(71) Applicant: Otis Elevator Company, Farmington, CT (US)

(72) Inventors: Lindsay Wos, Florence, SC (US); Tarique Faruki, Florence, SC (US)

(73) Assignee: OTIS ELEVATOR COMPANY, Farmington, CT (US)

(*) Notice: Subject to any disclaimer, the term of this patent is extended or adjusted under 35 U.S.C. 154(b) by 847 days.

(21) Appl. No.: 15/713,733

(22) Filed: Sep. 25, 2017

(65) Prior Publication Data

US 2019/0094358 A1 Mar. 28, 2019

(51) Int. Cl.
*G01S 17/04* (2020.01)
*B66B 1/34* (2006.01)
*G01V 8/20* (2006.01)
*B66B 5/00* (2006.01)
*G01N 21/62* (2006.01)

(52) U.S. Cl.
CPC ............ *G01S 17/04* (2020.01); *B66B 1/3492* (2013.01); *B66B 5/0031* (2013.01); *B66B 5/0043* (2013.01); *G01N 21/62* (2013.01); *G01V 8/20* (2013.01)

(58) Field of Classification Search
CPC ..... G01S 17/04; B66B 1/3492; B66B 1/0043; B66B 5/0043; B66B 5/0031; G01N 21/62
USPC .......................................................... 187/391
See application file for complete search history.

(56) References Cited

U.S. PATENT DOCUMENTS

| 3,727,069 | A | * | 4/1973 | Crittenden, Jr. | ........ | G01P 3/685 |
| | | | | | | 250/222.1 |
| 4,384,201 | A | * | 5/1983 | Carroll | ..................... | G01V 8/20 |
| | | | | | | 250/221 |
| 4,652,741 | A | * | 3/1987 | Golborne | .............. | G06F 3/0421 |
| | | | | | | 250/221 |
| 4,763,903 | A | * | 8/1988 | Goodwin | ................... | F41J 5/02 |
| | | | | | | 250/222.1 |
| 5,130,532 | A | * | 7/1992 | Clemens | .................. | G01V 8/20 |
| | | | | | | 250/221 |
| 5,577,733 | A | * | 11/1996 | Downing | ................... | F41J 1/10 |
| | | | | | | 250/222.2 |

(Continued)

FOREIGN PATENT DOCUMENTS

| CN | 1286207 A | 3/2001 |
| CN | 1644479 A | 7/2005 |

(Continued)

OTHER PUBLICATIONS

EP Application No. 18196309.1 Extended EP Search Report dated Feb. 25, 2019, 8 pages.

*Primary Examiner* — David S Warren
(74) *Attorney, Agent, or Firm* — Cantor Colburn LLP

(57) ABSTRACT

According to an aspect, a method includes detecting, by a computing system, whether there are any pre-existing objects between a first group of sensors of a sensor array in an elevator shaft. The computing system detects whether there is a foreign object between a second group of sensors of the sensor array in the elevator shaft, where the second group of sensors includes at least one sensor that differs from the first group of sensors. The computing system triggers a modification to a control aspect of an elevator car in the elevator shaft based on detection of the foreign object.

14 Claims, 8 Drawing Sheets

(56) References Cited

U.S. PATENT DOCUMENTS

| | | | | |
|---|---|---|---|---|
| 5,626,526 A * | 5/1997 | Pao | ................... | A63B 24/0021 |
| | | | | 473/152 |
| 5,988,645 A * | 11/1999 | Downing | ................... | F41J 5/02 |
| | | | | 250/222.2 |
| 6,380,503 B1 * | 4/2002 | Mills | ................... | B07C 5/10 |
| | | | | 209/579 |
| 6,958,465 B2 * | 10/2005 | Haberer | ................... | G01V 8/20 |
| | | | | 209/586 |
| 6,991,067 B2 | 1/2006 | Dube et al. | | |
| 7,081,713 B2 * | 7/2006 | Jurs | ................... | F16P 3/144 |
| | | | | 250/221 |
| 7,140,469 B2 | 11/2006 | Deplazes et al. | | |
| 7,741,595 B2 * | 6/2010 | Lohmann | ................... | G01V 8/20 |
| | | | | 250/221 |
| 7,954,606 B2 | 6/2011 | Tinone et al. | | |
| 7,980,362 B2 * | 7/2011 | Kostka | ................... | B66B 5/0031 |
| | | | | 187/249 |
| 8,061,486 B2 * | 11/2011 | Monzon | ................... | B66B 5/005 |
| | | | | 187/392 |
| 8,556,043 B2 * | 10/2013 | Mangini | ................... | B66B 5/005 |
| | | | | 187/392 |
| 8,862,431 B2 * | 10/2014 | Hodge | ................... | F41J 5/041 |
| | | | | 702/150 |
| 9,359,171 B1 | 6/2016 | Nowel | | |
| 9,399,562 B2 | 7/2016 | Terry et al. | | |
| 9,791,594 B2 * | 10/2017 | Eble | ................... | G01V 8/20 |
| 9,921,309 B1 * | 3/2018 | Skowronek | ................... | G01S 7/4802 |
| 2003/0218122 A1 * | 11/2003 | Haberer | ................... | G01V 8/20 |
| | | | | 250/221 |
| 2004/0124341 A1 * | 7/2004 | Parstorfer | ................... | G01V 8/20 |
| | | | | 250/221 |
| 2004/0173414 A1 * | 9/2004 | Deplazes | ................... | B66B 5/0043 |
| | | | | 187/300 |
| 2004/0178942 A1 * | 9/2004 | McLemore | ................... | G01S 13/888 |
| | | | | 342/22 |
| 2004/0246336 A1 * | 12/2004 | Kelly, III | ................... | G06K 9/38 |
| | | | | 348/143 |
| 2010/0048313 A1 * | 2/2010 | Mooney | ................... | A63B 24/0021 |
| | | | | 473/199 |
| 2010/0127158 A1 * | 5/2010 | Scheiber | ................... | F16P 3/144 |
| | | | | 250/208.1 |
| 2010/0320036 A1 * | 12/2010 | Ferreira | ................... | B66B 1/3492 |
| | | | | 187/394 |
| 2011/0056134 A1 * | 3/2011 | Zacchio | ................... | E05F 15/73 |
| | | | | 49/31 |
| 2011/0067958 A1 * | 3/2011 | Schuster | ................... | B66B 5/0006 |
| | | | | 187/393 |
| 2011/0094832 A1 | 4/2011 | Monzon et al. | | |
| 2016/0033334 A1 * | 2/2016 | Zhevelev | ................... | G08B 13/19 |
| | | | | 250/349 |
| 2016/0296797 A1 * | 10/2016 | Rosen | ................... | G09B 19/0038 |
| 2017/0315262 A1 * | 11/2017 | Collins | ................... | B66B 13/26 |
| 2018/0143321 A1 * | 5/2018 | Skowronek | ................... | G01S 15/89 |
| 2019/0092601 A1 * | 3/2019 | Tegtmeier | ................... | B66B 5/005 |
| 2019/0094358 A1 * | 3/2019 | Wos | ................... | B66B 5/0043 |
| 2019/0272735 A1 * | 9/2019 | Carparelli | ................... | H04W 76/10 |
| 2019/0322485 A1 * | 10/2019 | Kattainen | ................... | B66B 5/02 |

FOREIGN PATENT DOCUMENTS

| | | |
|---|---|---|
| CN | 101628676 A | 1/2010 |
| CN | 101844720 A | 9/2010 |
| CN | 102530691 | 7/2012 |
| CN | 106542395 | 3/2017 |
| CN | 106542396 | 3/2017 |
| EP | 1431228 A2 | 6/2004 |
| EP | 2080725 | 7/2009 |
| JP | 06127861 | 5/1994 |
| JP | H0726753 A | 10/1995 |
| JP | H0891729 A | 4/1996 |
| JP | 08113440 | 5/1996 |
| JP | 2003212448 | 7/2003 |
| JP | 2005096891 | 4/2005 |
| JP | 2008019039 | 1/2008 |
| JP | 2010023929 A | 2/2010 |
| JP | 2017109847 A | 6/2017 |
| WO | 2006067542 A1 | 6/2006 |

* cited by examiner

ELEVATOR SENSOR ARRAY SYSTEM

BACKGROUND

The subject matter disclosed herein generally relates to elevator systems and, more particularly, to an elevator sensor array system.

Elevator systems can present risks to maintenance personnel due to the confined spaces in which elevators operate, the weight of elevator components, and the motion of elevator components. Elevator mechanics and other individuals may be exposed to an increased risk while in an elevator shaft.

BRIEF SUMMARY

According to some embodiments, a method of detecting a foreign object using an elevator sensor array system is provided. A computing system detects whether there are any pre-existing objects between a first group of sensors of a sensor array in an elevator shaft. The computing system detects whether there is a foreign object between a second group of sensors of the sensor array in the elevator shaft. The second group of sensors includes at least one sensor that differs from the first group of sensors. The computing system triggers a modification to a control aspect of an elevator car in the elevator shaft based on detection of the foreign object.

In addition to one or more of the features described above or below, or as an alternative, further embodiments may include where the sensor array includes a plurality of sensors distributed about a perimeter within the elevator shaft.

In addition to one or more of the features described above or below, or as an alternative, further embodiments may include where the perimeter includes at least four sides, and one or more of the sensors are on each of the at least four sides forming a detection field.

In addition to one or more of the features described above or below, or as an alternative, further embodiments may include where the sensors form a grid as the detection field.

In addition to one or more of the features described above or below, or as an alternative, further embodiments may include where the sensors are arranged in pairs to form a diagonal detection pattern between at least two adjacent sides of the perimeter.

In addition to one or more of the features described above or below, or as an alternative, further embodiments may include where the sensors are light sensors, each of the light sensors including an emitter and a receiver.

In addition to one or more of the features described above or below, or as an alternative, further embodiments may include where the modification to the control aspect of the elevator car includes: reducing a maximum rate of travel of the elevator car in the shaft, preventing the elevator car from going to an uppermost level of the shaft based on detecting the foreign object above the elevator car, or preventing the elevator car from going to the lowest level of the shaft based on detecting the foreign object below the elevator car.

In addition to one or more of the features described above or below, or as an alternative, further embodiments may include determining a size estimate of the foreign object based on a number of sensors and a position of the sensors in the second group of sensors that are used to detect the foreign object, where the modification to the control aspect of the elevator car is determined, at least in part, based on the size estimate of the foreign object.

In addition to one or more of the features described above or below, or as an alternative, further embodiments may include triggering a warning indicator based on the size estimate of the foreign object.

According to some embodiments, an elevator sensor array system is provided including sensor array operable in an elevator shaft and a computing system. The computing system includes a memory and a processor that detects whether there are any pre-existing objects between a first group of sensors of the sensor array in the elevator shaft, detects whether there is a foreign object between a second group of sensors of the sensor array in the elevator shaft, and triggers a modification to a control aspect of an elevator car in the elevator shaft based on detection of the foreign object, where the second group of sensors includes at least one sensor that differs from the first group of sensors.

Technical effects of embodiments of the present disclosure include triggering a modification to a control aspect of an elevator car in an elevator shaft based on detection of a foreign object by an elevator sensor array system. By first establishing locations of pre-existing objects in a detection field of an elevator sensor array, foreign objects can be distinguished from the pre-existing objects and false positives reduced/prevented.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

A detailed description of one or more embodiments of the disclosed apparatus and method are presented herein by way of exemplification and not limitation with reference to the Figures.

Figure 1:
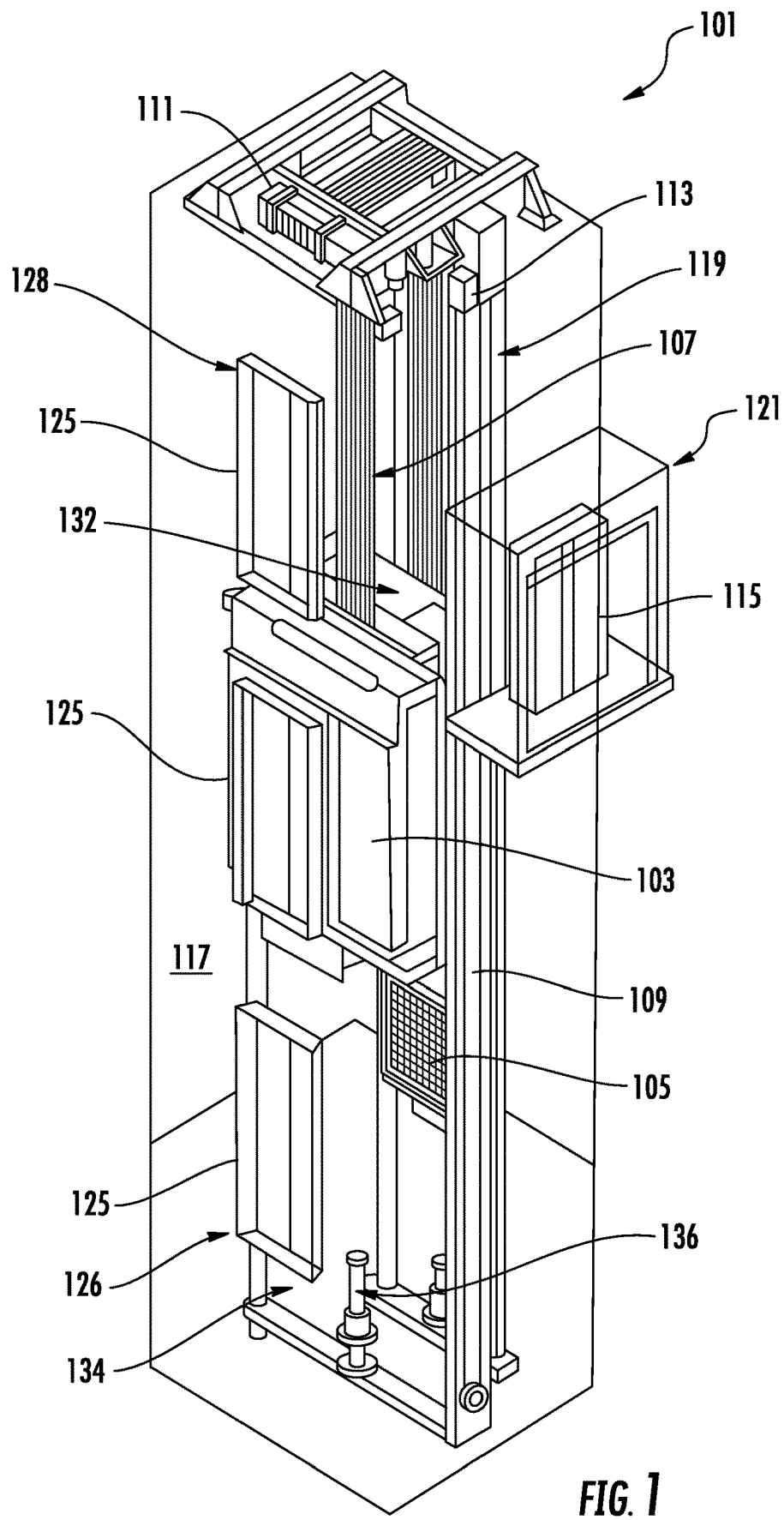
FIG. 1 is a schematic illustration of an elevator system that may employ various embodiments of the present disclosure.

FIG. 1 is a perspective view of an elevator system 101 including an elevator car 103, a counterweight 105, one or more load bearing members 107, a guide rail 109, a machine 111, a position encoder 113, and an elevator controller 115. The elevator car 103 and counterweight 105 are connected to each other by the load bearing members 107. The load bearing members 107 may be, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The load bearing members 107 engage the machine 111, which is part of an overhead structure of the elevator system 101. The machine 111 is configured to control movement between the elevator car 103 and the counterweight 105. The position encoder 113 may be mounted on an upper sheave of a speed-governor system 119 and may be configured to provide position signals related to a position of the elevator car 103 within the elevator shaft 117. In other embodiments, the position encoder 113 may be directly mounted to a moving component of the machine 111, or may be located in other positions and/or configurations as known in the art.

The elevator controller 115 is located, as shown, in a controller room 121 of the elevator shaft 117 and is configured to control the operation of the elevator system 101, and particularly the elevator car 103. For example, the elevator controller 115 may provide drive signals to the machine 111 to control the acceleration, deceleration, leveling, stopping, etc. of the elevator car 103. The elevator controller 115 may also be configured to receive position signals from the position encoder 113. When moving up or down within the elevator shaft 117 along guide rail 109, the elevator car 103 may stop at one or more landings 125 as controlled by the elevator controller 115 between a lowest level 126 and an uppermost level 128. Although shown in a controller room 121, those of skill in the art will appreciate that the elevator controller 115 can be located and/or configured in other locations or positions within the elevator system 101. In some embodiments, the elevator controller 115 can be configured to control features within the elevator car 103, including, but not limited to, lighting, display screens, music, spoken audio words, etc.

The machine 111 may include a motor or similar driving mechanism and an optional braking system. In accordance with embodiments of the disclosure, the machine 111 is configured to include an electrically driven motor. The power supply for the motor may be any power source, including a power grid, which, in combination with other components, is supplied to the motor. Although shown and described with a rope-based load bearing system, elevator systems that employ other methods and mechanisms of moving an elevator car within an elevator shaft, such as hydraulics, ropeless, or any other methods, may employ embodiments of the present disclosure. FIG. 1 is merely a non-limiting example presented for illustrative and explanatory purposes.

Embodiments detect the presence of a foreign object within the elevator shaft 117 using an elevator sensor array system. An elevator sensor array can be installed at a location 132 above the elevator car 103 and/or below the elevator car 103, such as in a pit 134 below the lowest level 126 of the elevator car 103 in the elevator shaft 117. In some locations, it is expected that pre-existing structures, such as stops 136 in the pit 134, may partially reduce a detection field of an elevator sensor array intended to detection foreign objects, such as a person. Embodiments initially establish locations of pre-existing objects to avoid false positives and assist in distinguishing foreign objects from pre-existing objects before triggering a modification to a control aspect of the elevator car 103 in the elevator shaft 117 based on detection of a foreign object. Positioning offsets, such as raising elevator sensor arrays above the floor of the pit 134 or above an upper surface of the elevator car 103 can also reduce false positives and/or excessive sensor obstruction due to rodents, refuse, and other potential sources of unintended sensor obstruction. Further aspects of elevator sensor array systems are described in reference to FIGS. 2-9.

Figure 2:
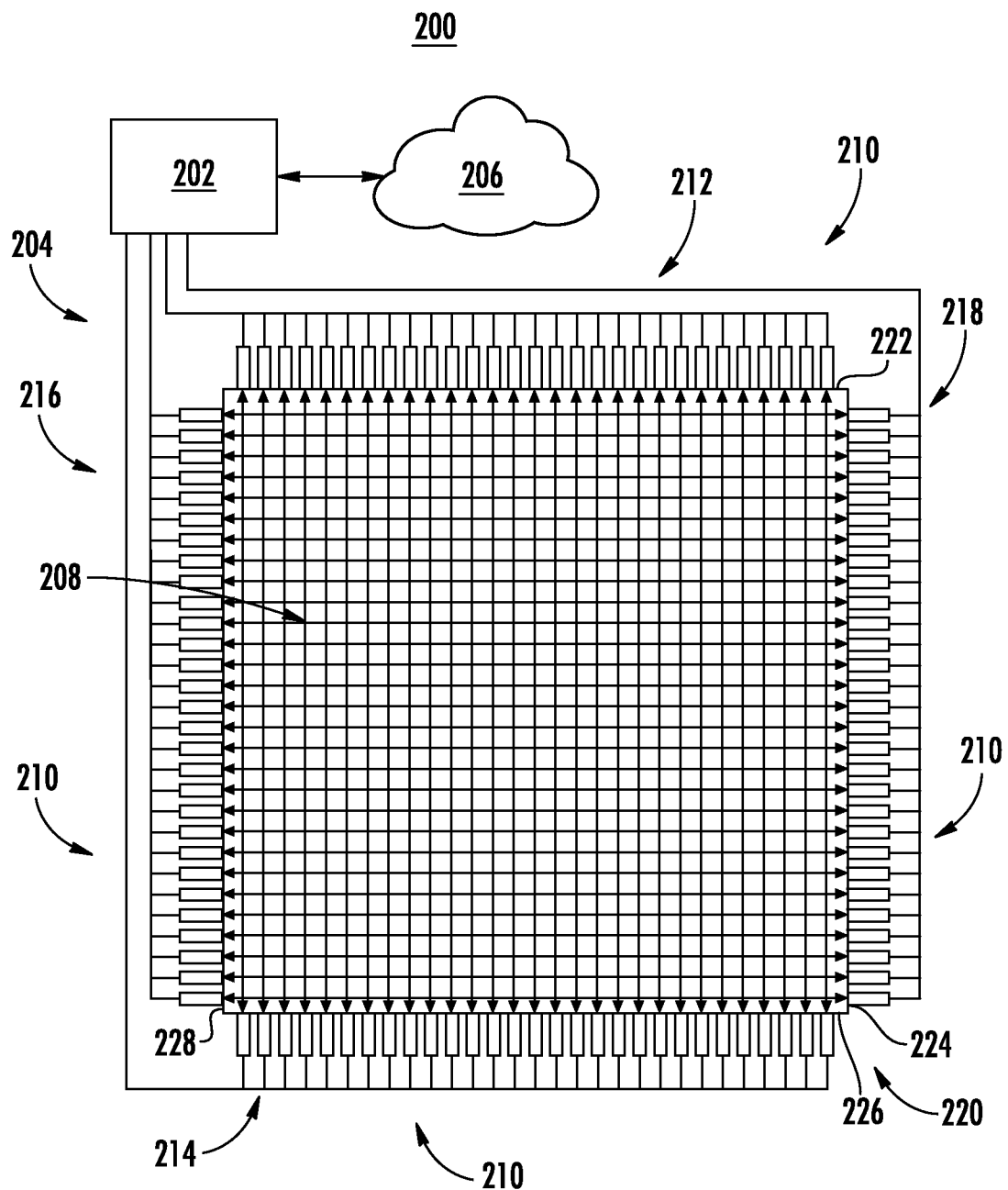
FIG. 2 is a schematic illustration of an elevator sensor array system in accordance with an embodiment of the present disclosure.

FIG. 2 is a schematic illustration of an elevator sensor array system 200 in accordance with an embodiment of the present disclosure. The elevator sensor array system 200 includes a computing system 202 and a sensor array 204 operable in the elevator shaft 117 of FIG. 1. The computing system 202 can acquire sensor data from the sensor array 204 and perform processing independently or in cooperation with cloud computing resources 206. The cloud computing resources 206 can include computers linked through one or more wired, wireless, or satellite links. In some embodiments, one or more remote users can access the computing system 202 remotely through the cloud computing resources 206 to determine whether objects are present in a detection field 208 formed by the sensor array 204 and/or to make configuration updates. Processing as described herein can be performed by any combination of the elevator controller 115 of FIG. 1, computing system 202, and/or cloud computing resources 206 (e.g., remote processing resources).

Figure 7:
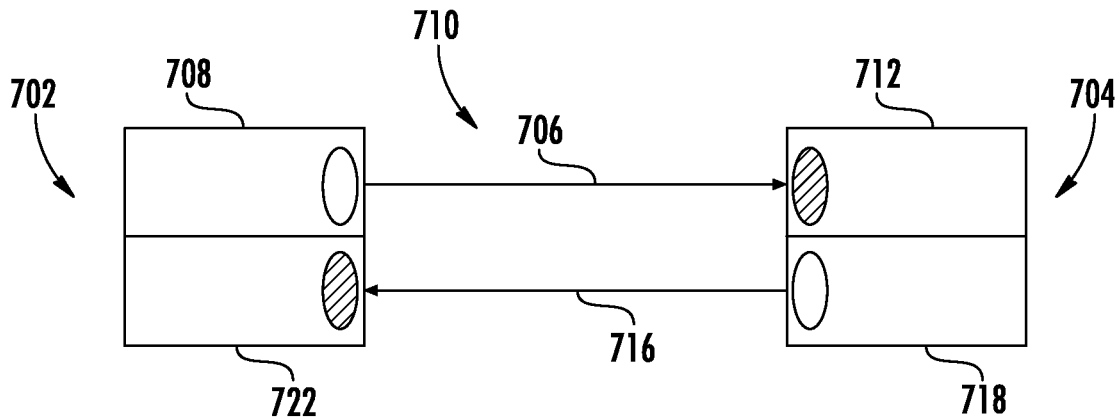
FIG. 7 is a schematic illustration of a pair of sensors in an elevator sensor array system in accordance with an embodiment of the present disclosure.

The sensor array 204 can be formed from a plurality of sensors 210 arranged in sensor rows 212, 214 and sensor columns 216, 218 about a perimeter 220 within the elevator shaft 117 of FIG. 1. The perimeter 220 can be formed of four or more sides 222, 224, 226, 228. The perimeter 220 can be internal walls or a support structure in the elevator shaft 117, such as a location slightly elevated (e.g., one foot) above the floor of the pit 134 below the lowest level 126 reachable by the elevator car 103. Alternatively, the perimeter 220 can be at location 132 slightly above (e.g., one foot) the elevator car 103, where the sensor array 204 is coupled to the elevator car 103. It will be understood that multiple instances of the sensor array 204 can be installed within the elevator shaft 117, such as at locations both above and below the elevator car 103. In the example of FIG. 2, the detection field 208 is formed as a grid pattern of an emitted radiation source, such as light, that extends between sides 222 and 226 and between sides 224 and 228 of the perimeter 220. For instance, when implemented with light sensors, the sensors 210 of sensor row 212 at side 222 emit light to be detected by sensors 210 of sensor row 214 at side 226. The sensors 210 of sensor row 212 can also detect light emitted from sensors 210 of sensor row 214. Similarly, the sensors 210 of sensor column 216 at side 228 can emit light to be detected by sensors 210 of sensor column 218 at side 224. The sensors 210 of sensor column 216 can also detect light emitted from sensors 210 of sensor column 218. The sensors 210 can be arranged in alternating patterns of emitters and receivers in each of the sensor rows 212, 214 and sensor columns 216, 218. When an emitter and a receiver of each sensor 210 are in close physical proximity or physically coupled together, beam redundancy can be achieved for enhanced protection in the event of an emitter or receiver failure (as best seen in FIG. 7). An object within the detection field 208 can be sensed by one or more sensors 210 based on obstructing one or more emitted beams from reaching one or more sensors 210 configured to receive the emitted beams as further illustrated in the example of FIG. 3.

Figure 3:
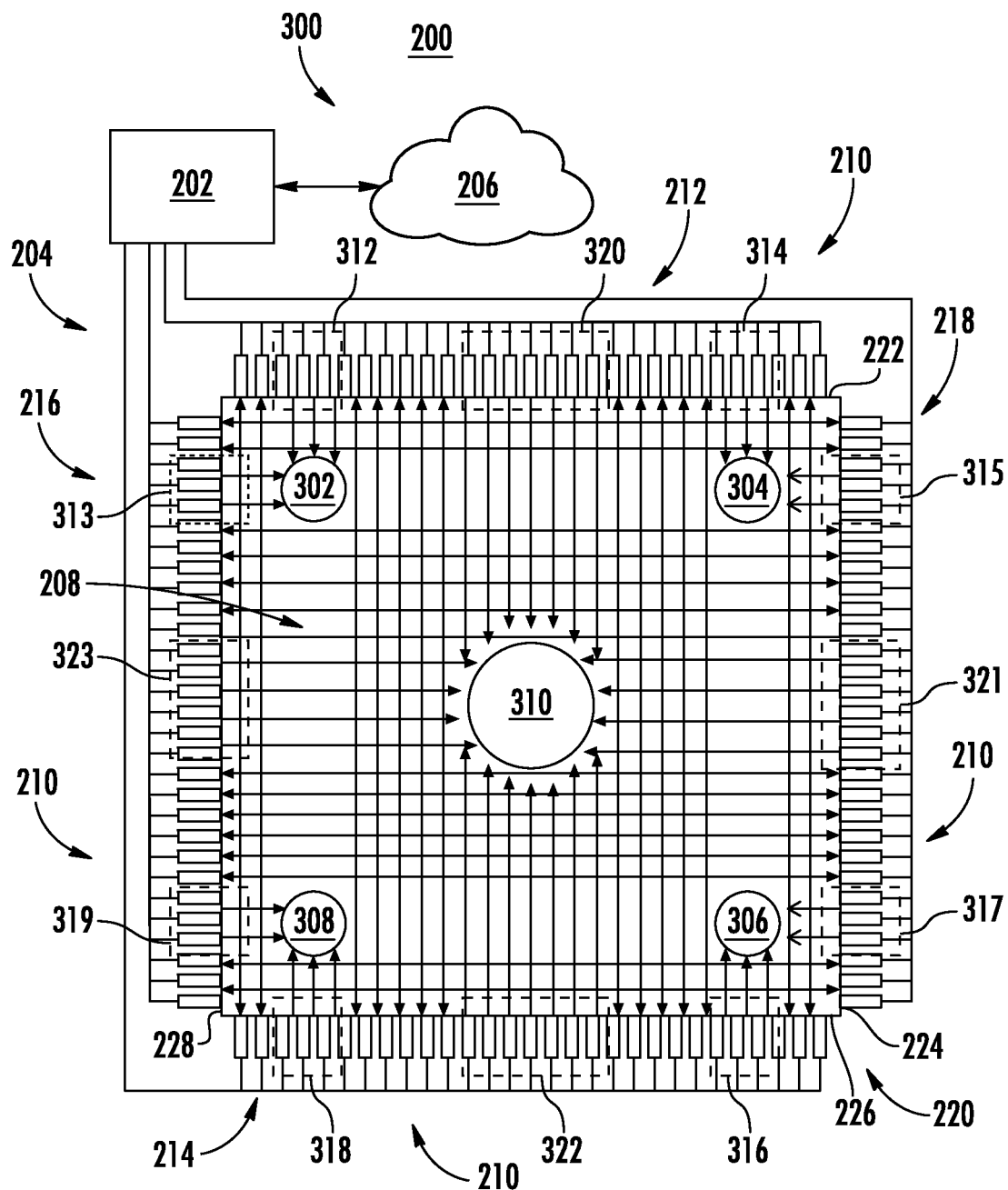
FIG. 3 is a schematic illustration of an elevator sensor array system with pre-existing objects in accordance with an embodiment of the present disclosure.

FIG. 3 depicts a schematic illustration of a configuration 300 of the elevator sensor array system 200 with a plurality of pre-existing objects 302, 304, 306, 308, and 310. During a start-up or calibration mode of operation, the computing system 202 can detect that a plurality of sensors 210 are obstructed. For example, beams emitted from a group 312 of sensors 210 on side 222 and from a group 313 of sensors 210 on side 228 are obstructed by pre-existing object 302, and thus the corresponding beams do not reach opposite sides 226 and 224 respectively. Similarly, beams emitted from a group 314 of sensors 210 on side 222 and from a group 315 of sensors 210 on side 224 are obstructed by pre-existing object 304, and thus the corresponding beams do not reach opposite sides 226 and 228 respectively. The computing system 202 can detect these beam gaps in the detection field 208, where emitted beams are not received. Arranging sensors 210 in a grid pattern of sensor rows 212, 214 and sensor columns 216, 218 can enable the computing system 202 and/or cloud computing resources 206 to determine locations and approximate size of the pre-existing objects 302-310.

As a further example, beams emitted from a group 316 of sensors 210 on side 226 and from a group 317 of sensors 210 on side 224 are obstructed by pre-existing object 306. Beams emitted from a group 318 of sensors 210 on side 226 and from a group 319 of sensors 210 on side 228 are obstructed by pre-existing object 308. Pre-existing object 310 obstructs beams emitted from a group 320 of sensors 210 on side 222, from a group 321 of sensors 210 on side 224, from a group 322 of sensors 210 on side 226, and from a group 323 of sensors 210 on side 228. Based on the on/off type detection within the detection field 208 and known locations of the sensors 210, sizing and location of the pre-existing objects 302-310 can be used to filter out known objects from foreign objects. For instance, if the pre-existing object 302 obstructs sensors 210 of sensor row 212 known to be offset by two feet from side 228 and spanning a placement distance of eighteen inches (e.g., example width of group 312) in combination with obstructing sensors 210 of sensor column 216 known to be offset by one foot from side 222 and also spanning a placement distance of eighteen inches (e.g., example width of group 313), then the pre-existing object 302 can be assessed as occupying an area of about 2.25 square feet at a specific location within the detection field 208.

Figure 4:
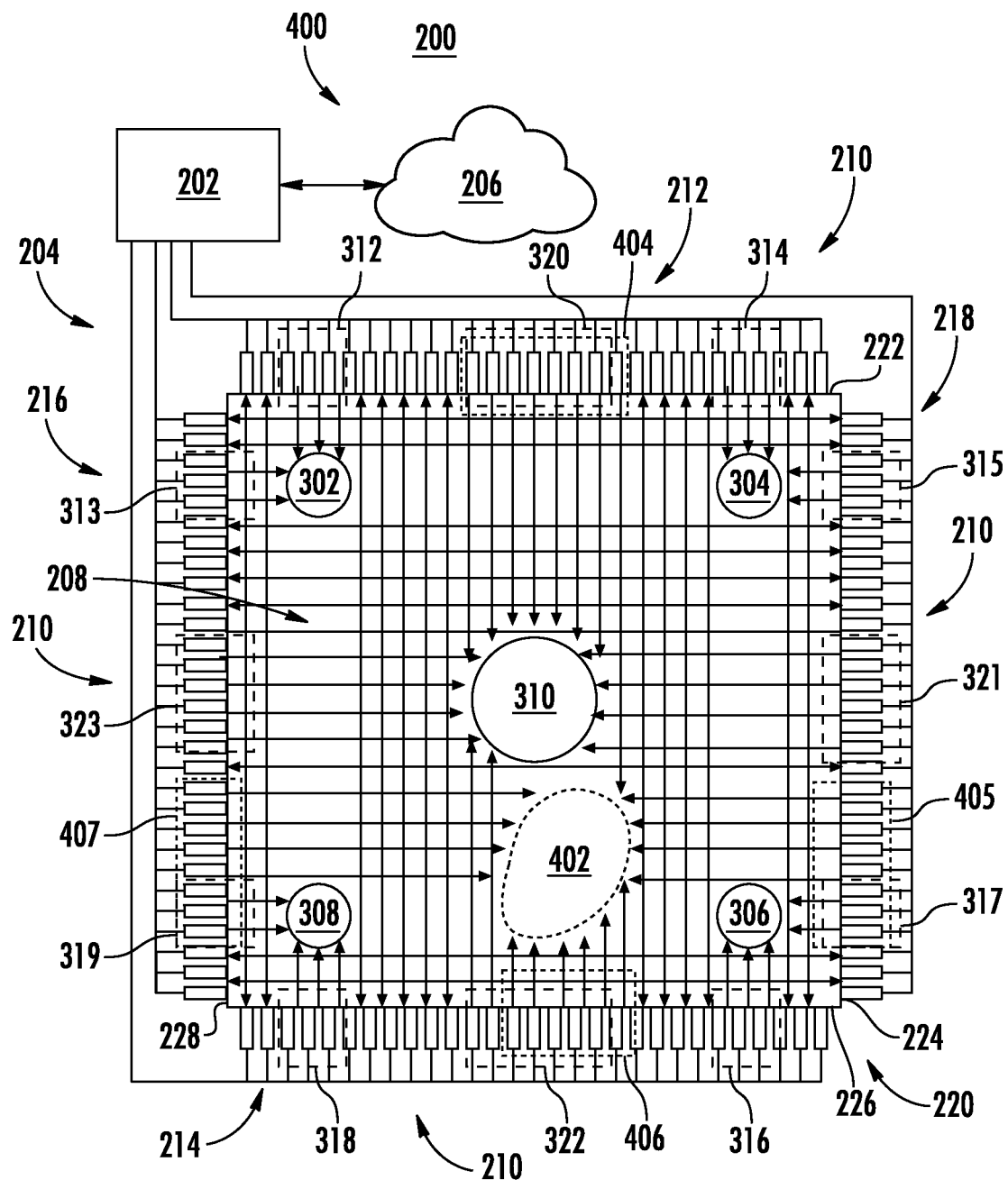
FIG. 4 is a schematic illustration of an elevator sensor array system with pre-existing objects and a foreign object in accordance with an embodiment of the present disclosure.

FIG. 4 depicts a schematic illustration of a configuration 400 of the elevator sensor array system 200 with pre-existing objects 302, 304, 306, 308, 310 and a foreign object 402. The foreign object 402 can be any object detected by the elevator sensor array system 200 other than the pre-existing objects 302-310. After start-up or a calibration mode of operation, the computing system 202 can detect that one or more sensors 210 are obstructed beyond those already known to be obstructed in groups 312, 313, 314, 315, 316, 317, 318, 319, 320, 321, 322, 323 associated with pre-existing objects 302-310. For example, beams emitted from a group 404 of sensors 210 on side 222, from a group 405 of sensors 210 on side 224, from group 406 of sensors 210 on side 226, and from group 407 of sensors 210 on side 228 are obstructed by foreign object 402. Each of the groups 404, 405, 406, 407 includes at least one sensor 210 that does not overlap with corresponding groups 320, 317, 322, and 319 respectively. For instance, group 404 can be defined to include only sensors 210 that extend beyond group 320 due to an overlap in sensors 210 obstructed by pre-existing object 310 and foreign object 402. Alternatively, the group 404 can be defined as group 320 plus any additional sensors 210 that are obstructed extending beyond group 320. Similarly, in the example of FIG. 4, group 405 partially overlaps group 317 with respect to pre-existing object 306, group 406 partially overlaps group 322 with respect to pre-existing object 310, and group 407 partially overlaps group 319 with respect to pre-existing object 308. Thus, precise sizing estimates of the foreign object 402 may be limited due to the number of obstructions by pre-existing objects 302-310; however, a range of size estimates of the foreign object 402 can be made in view of the size and location of the pre-existing objects 302-310.

Figure 5:
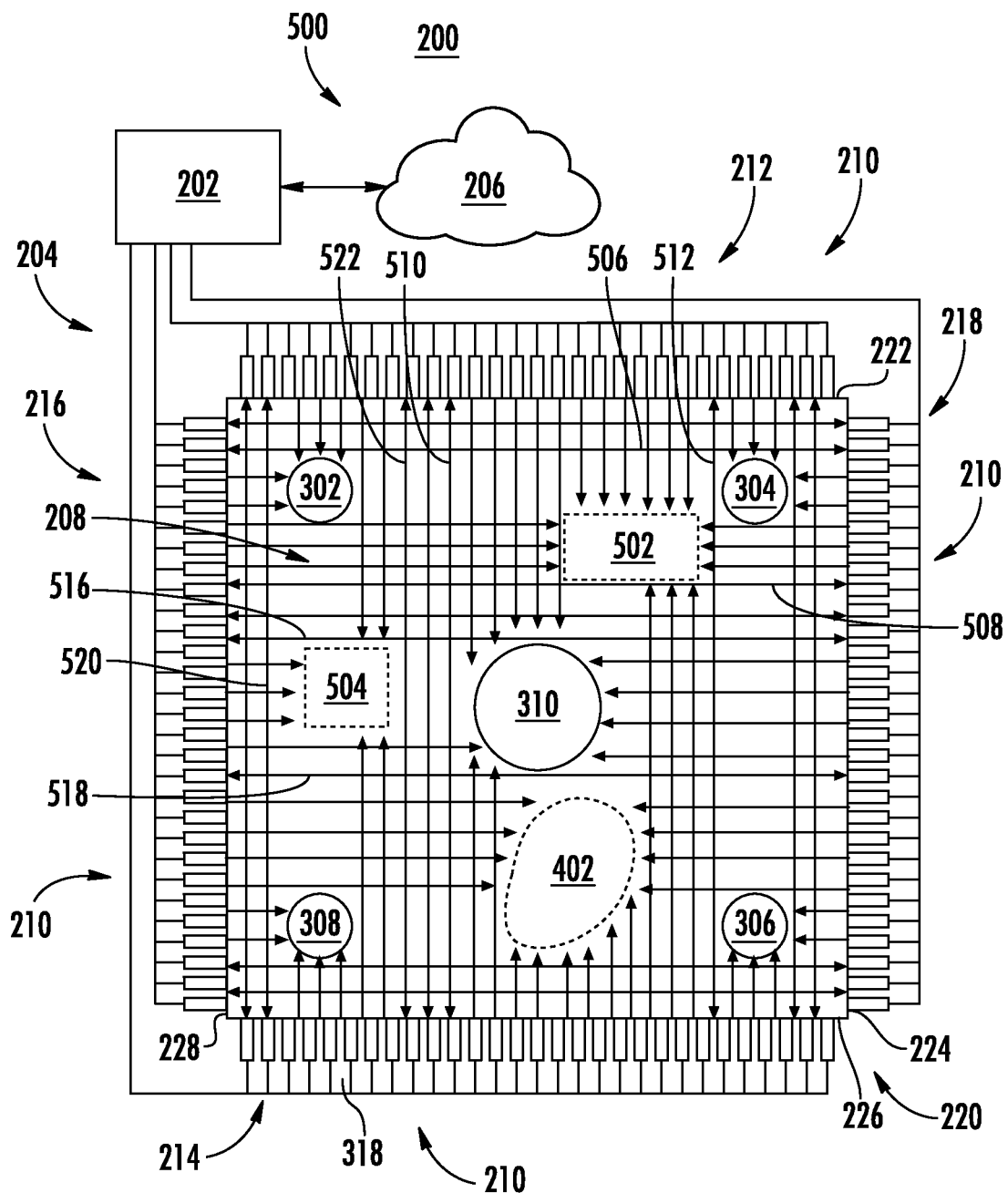
FIG. 5 is a schematic illustration of an elevator sensor array system with pre-existing objects and foreign objects in accordance with an embodiment of the present disclosure.

FIG. 5 depicts a schematic illustration of a configuration 500 of the elevator sensor array system 200 with pre-existing objects 302, 304, 306, 308, 310 and foreign objects 402, 502, 504. Using sizing and location information previously learned about pre-existing objects 302-310 and beams of sensors 210 that are able to cross the detection field 208 unobstructed, the existence of foreign objects 402, 502, 504 and approximate sizing and location information can be determined by the computing system 202. For example, beams 506, 508 pass between sensor columns 216, 218 on sides 228, 224 above and below foreign object 502, while beams 510, 512 pass to the left and right of foreign object 502 between sensor rows 212, 214 on sides 222, 226. Similarly, beams 516, 518 pass between sensor columns 216, 218 on sides 228, 224 above and below foreign object 504, while beams 520, 522 pass to the left and right of foreign object 504 between sensor rows 212, 214 on sides 222, 226.

Figure 6:
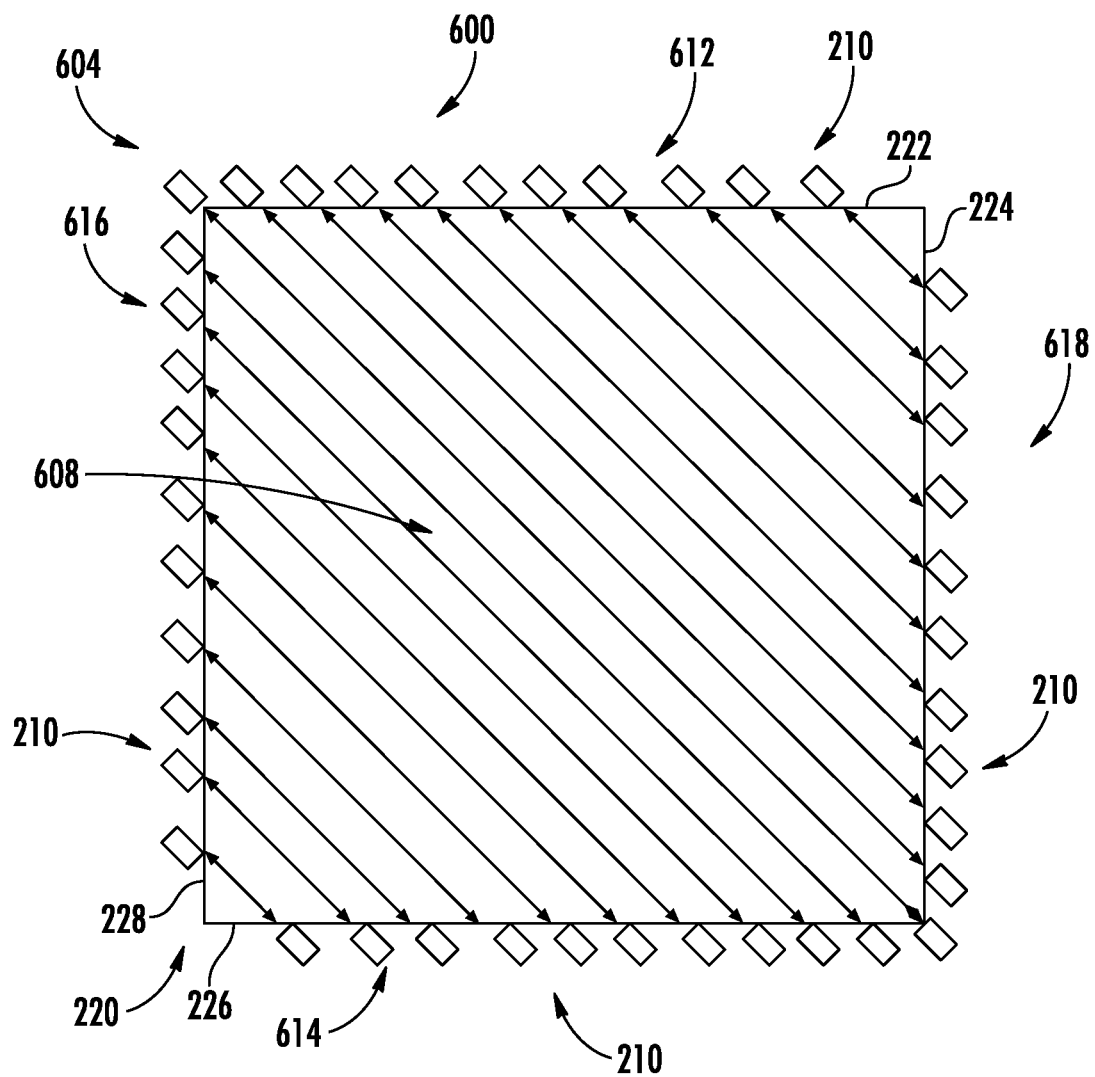
FIG. 6 is a schematic illustration of an elevator sensor array system in a diagonal configuration in accordance with an embodiment of the present disclosure.

FIG. 6 depicts a schematic illustration a diagonal configuration 600 of a sensor array 604 including a plurality of sensors 210 arranged in sensor rows 612, 614 and sensor columns 616, 618 about perimeter 220 within the elevator shaft 117 of FIG. 1. In the example of FIG. 6, a detection field 608 is formed as a diagonal detection pattern between at least two adjacent sides 222-228 of the perimeter 220. For instance, when implemented with light sensors, the sensors 210 of sensor row 612 at side 222 emit light to be detected by sensors 210 of sensor column 618 at side 224. The sensors 210 of sensor row 612 can also detect light emitted from sensors 210 of sensor column 618. Similarly, the sensors 210 of sensor column 616 at side 228 can emit light to be detected by sensors 210 of sensor row 614 at side 226. The sensors 210 of sensor column 616 can also detect light emitted from sensors 210 of sensor row 614. Similar to the example of FIGS. 2-5, the sensors 210 can be arranged in alternating patterns of emitters and receivers; however, the emitters and receivers of the sensors 210 are arrange at a diagonal with respect to sides 222-228 rather than parallel and perpendicular as in the grid pattern of the sensor array 204 of FIGS. 2-5. It will be understood that other arrangements of sensors 210 are contemplated within perimeter 220. For example, a mix of angles can be used and/or placement of sensors 210 can vary in height to increase the three-dimensional volume of the detection field 208, 608.

FIG. 7 depicts a schematic illustration of a pair of sensors 702, 704 in an elevator sensor array system in accordance with an embodiment of the present disclosure. The sensors 702, 704 are embodiments of the sensors 210 of FIGS. 2-6. The sensors 702, 704 can be placed on opposite sides 222/226, 224/228 or adjacent sides 222/224, 226/228 depending on whether a parallel grid or diagonal pattern is used, as previous described in the examples of FIGS. 2-6. In the example of FIG. 7, sensor 702 outputs a light beam 706 from an emitter 708 across an air gap 710 to a receiver 712 of sensor 704. Similarly, sensor 704 outputs a light beam 716 from an emitter 718 across the air gap 710 to a receiver 722 of sensor 702. If an object obstructs the light beam 706, the absence of the previous detected light beam 706 is observed at the receiver 712 of sensor 704. Similarly, if an object obstructs the light beam 716, the absence of the previous detected light beam 716 is observed at the receiver 722 of sensor 702. While the configuration of FIG. 7 represents one example sensor configuration, other sensor configurations are contemplated such as sensor/reflector pairs, laser-based sensors, ultrasonic sensors, radar sensors, infrared sensors, and other such sensing technologies known in the art.

Figure 8:
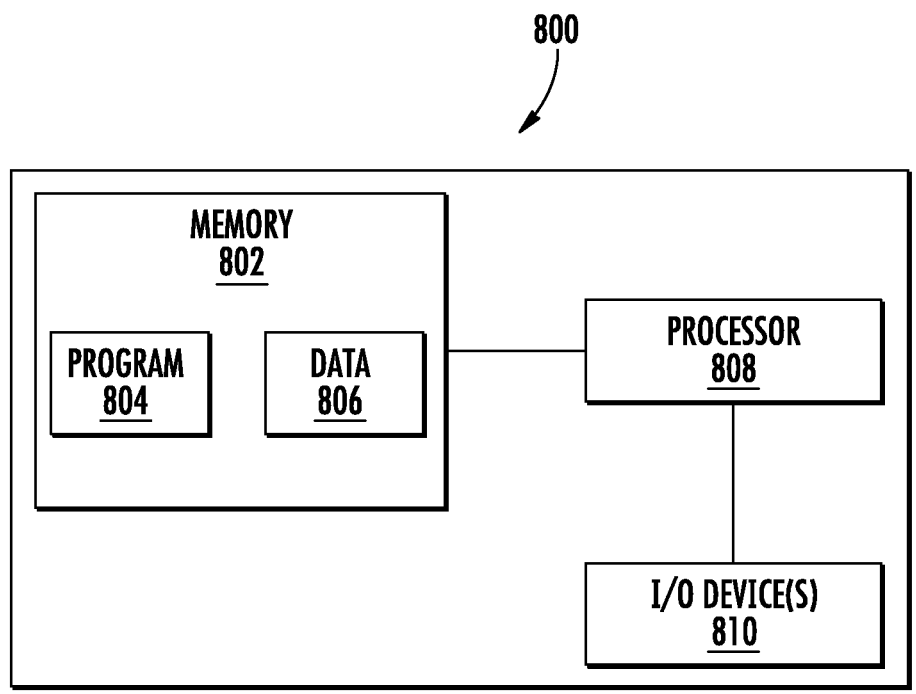
FIG. 8 is a schematic block diagram illustrating a computing system that may be configured for one or more embodiments of the present disclosure.

Referring now to FIG. 8, an exemplary computing system 800 that can be incorporated into elevator systems of the present disclosure is shown. The computing system 800 may be configured as part of and/or in communication with an elevator controller, e.g., controller 115 shown in FIG. 1, as part of the computing system 202 and/or cloud computing resources 206 of FIG. 2 as described herein. The computing system 800 can be an embedded computing device, a mobile device, a tablet, a laptop computer, a microcontroller, a rack-based computing system or the like and can be located at or distributed between one or more network-accessible servers. For instance, the elements of computing system 800 can be duplicated in the computing system 202 and in other computing systems (not depicted) that provide the cloud computing resources 206. The computing system 800 includes a memory 802 which can store executable instructions and/or data associated with the elevator sensor array system 200 of FIG. 2. The executable instructions can be stored or organized in any manner and at any level of abstraction, such as in connection with one or more applications, processes, routines, procedures, methods, etc. As an example, at least a portion of the instructions are shown in FIG. 8 as being associated with a program 804 for processing sensor data and triggering actions in the elevator system 101 of FIG. 1.

Further, as noted, the memory 802 may store data 806. The data 806 may include, but is not limited to, elevator car data, sensor location data, pre-existing object data, foreign object data, elevator modes of operation, commands, or any other type(s) of data as will be appreciated by those of skill in the art. The instructions stored in the memory 802 may be executed by one or more processors, such as a processor 808. The processor 808 may be operative on the data 806.

The processor 808, as shown, is coupled to one or more input/output (I/O) devices 810. In some embodiments, the I/O device(s) 810 may include one or more of a keyboard or keypad, a touchscreen or touch panel, a display screen, a microphone, a speaker, a mouse, a button, a remote control, a joystick, a printer, a telephone or mobile device (e.g., a smartphone), a sensor, etc. The I/O device(s) 810, in some embodiments, include communication components, such as broadband or wireless communication elements.

The components of the computing system 800 may be operably and/or communicably connected by one or more buses. The computing system 800 may further include other features or components as known in the art. For example, the computing system 800 may include one or more transceivers and/or devices configured to transmit and/or receive information or data from sources external to the computing system 800 (e.g., part of the I/O devices 810). For example, in some embodiments, the computing system 800 may be configured to receive information over a network (wired or wireless) or through a cable or wireless connection with one or more devices remote from the computing system 800 (e.g. direct connection to an elevator machine, etc.). The information received over the communication network can stored in the memory 802 (e.g., as data 806) and/or may be processed and/or employed by one or more programs or applications (e.g., program 804) and/or the processor 808.

The computing system 800 is one example of a computing system, controller, and/or control system that is used to execute and/or perform embodiments and/or processes described herein. For example, the computing system 800, when configured as part of an elevator control system, is used to receive commands and/or instructions and is configured to control operation of an elevator car through control of an elevator machine. For example, the computing system 800 can be integrated into or separate from (but in communication therewith) an elevator controller and/or elevator machine and operate as a portion of elevator sensor array system 200 of FIG. 2.

Figure 9:
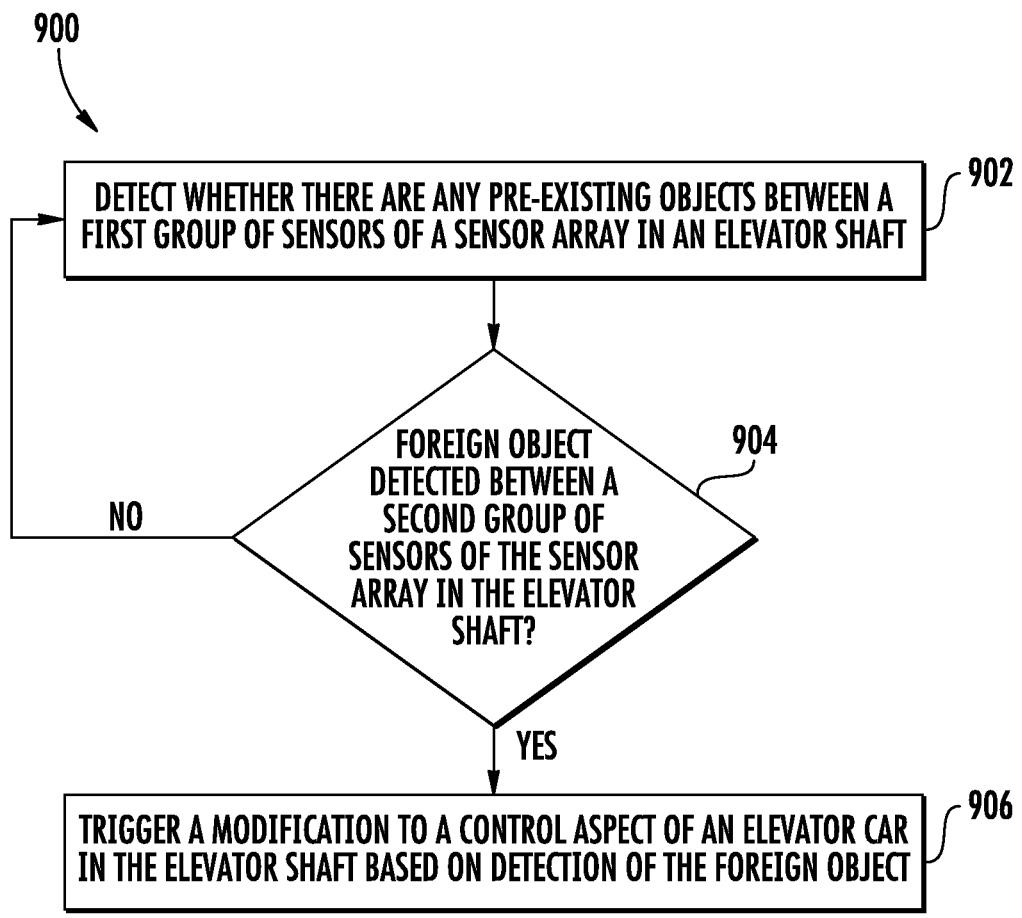
FIG. 9 is a process for foreign object detection by an elevator sensor array system in accordance with an embodiment of the present disclosure.

The computing system 800 is configured to operate the elevator sensor array system 200 of FIG. 2 using, for example, a flow process 900 of FIG. 9. The computing system 800 can include any combination of the computing system 202 and cloud computing resources 206 of FIG. 2. The flow process 900 can be performed by a computing system 800 of the elevator sensor array system 200 of FIG. 2 as shown and described herein and/or by variations thereon. Various aspects of the flow process 900 can be carried out using one or more sensors, one or more processors, and/or one or more machines and/or controllers. For example, some aspects of the flow process involve sensors, as described above, in communication with a processor or other control device and transmit detection information thereto. The flow process 900 is described in reference to FIGS. 1-9.

At block 902, a computing system 800 of the elevator sensor array system 200 detects whether there are any pre-existing objects 302-310 between a first group of sensors 210 of a sensor array 204 in an elevator shaft 117, where the first group can be a combination of two or more groups, such as groups 312-315, groups 316-319, and/or groups 320-323. The sensor array 204 can include a plurality of sensors 210 distributed about a perimeter 220 within the elevator shaft 117. The perimeter 220 can include at least four sides 222-228 with one or more of the sensors 210 on each of the at least four sides 222-228 forming a detection field 208. The sensors 210 can form a grid as the detection field 208, as in the examples of FIGS. 2-5. The sensors 210 can be arranged in pairs in a diagonal configuration 600 to form a diagonal detection pattern between at least two adjacent sides 222/224, 226/228 of the perimeter 220. In embodiments, the sensors 210 are light sensors, where each of the light sensors 210 includes an emitter and a receiver, such as emitter 708 and receiver 722 of sensor 702.

At block 904, the computing system 800 detects whether there is a foreign object 402 between a second group of sensors 210 of the sensor array 204 in the elevator shaft 117, where the second group of sensors includes at least one sensor 210 that differs from the first group of sensors, such as group 320 (first group) and group 404 (second group) of FIG. 4. A size estimate of the foreign object 402 can be determined based on a number of sensors 210 and a position of the sensors 210 in the second group of sensors 210 that are used to detect the foreign object 402. Size estimation can be a range of sizes depending on whether the foreign object 402 is partially obstructed by a pre-existing object 302-310. Known spacing and sensor placement positions can be used to estimate the size of the foreign object 402 using a similar approach as described in reference to the pre-existing objects 302-310.

At block 906, in the event that a foreign object is detected at step 904, the computing system 800 triggers a modification to a control aspect of an elevator car 103 in the elevator shaft 117 based on detection of the foreign object 402. The modification to the control aspect of the elevator car 103 can include reducing a maximum rate of travel of the elevator car 103 in the shaft 117. Where the sensor array 204 is installed above the elevator car 103, the modification to the control aspect of the elevator car 103 can include preventing the elevator car 103 from going to an uppermost level 128 of the shaft 117 based on detecting the foreign object 402 above the elevator car 103. Where the sensor array 204 is installed below the elevator car 103, such as in the pit 134, the modification to the control aspect of the elevator car 103 can include preventing the elevator car 103 from going to the lowest level 126 of the shaft 117 based on detecting the foreign object 402 below the elevator car 103. The modification to the control aspect of the elevator car 103 can be determined, at least in part, based on the size estimate of the foreign object 402. In some embodiments, if the maximum size of the foreign object 402 is estimated to be less than a size threshold, a different action can be taken, such as triggering a warning indicator (e.g., a light and/or audible alert) rather than or in addition to limiting/halting movement of the elevator car 103. Detection of the foreign object 402 can trigger a notification to one or more of: a building security system, a remote monitoring system, a servicing tool, and/or other systems (not depicted). Detection of the foreign object 402 can be logged by one or more systems to assist in event analysis and to further refine detection and response algorithms. Other actions and uses are contemplated and will be apparent to one of ordinary skill in the art.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer program products or computer-readable media, such as a transitory and/or non-transitory computer-readable medium. The instructions, when executed, may cause an entity (e.g., an apparatus or system) to perform one or more methodological acts as described herein.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method comprising:
   detecting, by a computing system, whether there are any pre-existing objects between a first group of sensors of a sensor array in an elevator shaft based on initially established locations of the pre-existing objects, wherein the sensor array comprises a plurality of sensors distributed about a perimeter within the elevator shaft, the perimeter comprises at least four sides, and one or more of the sensors are on each of the at least four sides forming a detection field;
   detecting, by the computing system, whether there is a foreign object between a second group of sensors of the sensor array in the elevator shaft, the second group of sensors including at least one sensor that does not overlap with the first group of sensors; and
   triggering, by the computing system, a modification to a control aspect of an elevator car in the elevator shaft based on detection of the foreign object.

2. The method of claim 1, wherein the sensors form a grid as the detection field.

3. The method of claim 1, wherein the sensors are arranged in pairs to form a diagonal detection pattern between at least two adjacent sides of the perimeter.

4. The method of claim 1, wherein the sensors are light sensors, each of the light sensors comprising an emitter and a receiver.

5. The method of claim 1, wherein the modification to the control aspect of the elevator car comprises: reducing a maximum rate of travel of the elevator car in the shaft, preventing the elevator car from going to an uppermost level of the shaft based on detecting the foreign object above the elevator car, or preventing the elevator car from going to the lowest level of the shaft based on detecting the foreign object below the elevator car.

6. The method of claim 1, further comprising:
   determining a size estimate of the foreign object based on a number of sensors and a position of the sensors in the second group of sensors that are used to detect the foreign object, wherein the modification to the control aspect of the elevator car is determined, at least in part, based on the size estimate of the foreign object.

7. The method of claim 6, further comprising:
triggering a warning indicator based on the size estimate of the foreign object.

8. An elevator sensor array system comprising:
a sensor array operable in an elevator shaft, wherein the sensor array comprises a plurality of sensors distributed about a perimeter within the elevator shaft, the perimeter comprises at least four sides, and one or more of the sensors are on each of the at least four sides forming a detection field; and
a computing system comprising a memory and a processor that detects whether there are any pre-existing objects between a first group of sensors of the sensor array in the elevator shaft based on initially established locations of the pre-existing objects, detects whether there is a foreign object between a second group of sensors of the sensor array in the elevator shaft, and triggers a modification to a control aspect of an elevator car in the elevator shaft based on detection of the foreign object, wherein the second group of sensors includes at least one sensor that differs from does not overlap with the first group of sensors.

9. The elevator sensor array system of claim 8, wherein the sensors form a grid as the detection field.

10. The elevator sensor array system of claim 9, wherein the sensors are arranged in pairs to form a diagonal detection pattern between at least two adjacent sides of the perimeter.

11. The elevator sensor array system of claim 8, wherein the sensors are light sensors, each of the light sensors comprising an emitter and a receiver.

12. The elevator sensor array system of claim 8, wherein the modification to the control aspect of the elevator car comprises: reducing a maximum rate of travel of the elevator car in the shaft, preventing the elevator car from going to an uppermost level of the shaft based on detecting the foreign object above the elevator car, or preventing the elevator car from going to the lowest level of the shaft based on detecting the foreign object below the elevator car.

13. The elevator sensor array system of claim 8, wherein the computing system determines a size estimate of the foreign object based on a number of sensors and a position of the sensors in the second group of sensors that are used to detect the foreign object, wherein the modification to the control aspect of the elevator car is determined, at least in part, based on the size estimate of the foreign object.

14. The elevator sensor array system of claim 13, wherein the computing system triggers a warning indicator based on the size estimate of the foreign object.

* * * * *